United States Patent [19]

Radford et al.

[11] 4,436,677
[45] Mar. 13, 1984

[54] NUCLEAR FUEL FABRICATION PROCESS

[75] Inventors: Kenneth C. Radford, Churchill; Don E. Harrison, Murrysville, both of Pa.

[73] Assignee: Westinghouse Electric Corp., Pittsburgh, Pa.

[21] Appl. No.: 403,969

[22] Filed: Aug. 2, 1982

[51] Int. Cl.³ ............................................. G21C 21/00
[52] U.S. Cl. ....................................... 264/0.5; 419/38; 419/42; 252/643
[58] Field of Search .................. 264/0.5, 65; 252/638, 252/643, 633; 376/903; 419/38, 42

[56] References Cited

U.S. PATENT DOCUMENTS

| | | | |
|---|---|---|---|
| 3,158,474 | 11/1964 | Anderson et al. | 419/38 |
| 3,189,666 | 6/1965 | Levey, Jr. et al. | 264/0.5 |
| 3,263,004 | 7/1966 | Bean | 264/0.5 |
| 3,269,826 | 8/1966 | Bumgarner | 75/10 |
| 3,502,755 | 3/1970 | Murray | 264/56 |
| 3,724,050 | 4/1973 | Velten et al. | 419/42 |
| 3,741,755 | 6/1973 | Allen | 75/214 |
| 3,761,546 | 9/1973 | Wilhelm et al. | 264/0.5 |
| 3,970,517 | 7/1976 | Van Nederveen | 264/0.5 |
| 4,000,235 | 12/1976 | Van Leemput | 264/109 |

FOREIGN PATENT DOCUMENTS

| | | | |
|---|---|---|---|
| 1646406 | 2/1973 | Fed. Rep. of Germany | 264/0.5 |
| 56-18641 | 4/1981 | Japan | 419/42 |

OTHER PUBLICATIONS

Ringel, H. and E. Zimmer., 1979. The external gelation of thorium process for preparation of $ThO_2$ and $(Th,U)O_2$ fuel kernels, Nuclear Technology, vol. 45: 287-297.

Primary Examiner—Deborah L. Kyle
Assistant Examiner—Howard J. Locker
Attorney, Agent, or Firm—R. D. Fuerle

[57] ABSTRACT

Disclosed is a method of making a pellet from a powder by placing the powder in a heat-shrinkable container, sealing the container and isostatically pressing the container at a temperature which causes it to shrink, followed by decomposition of the container and sintering of the powder. In preparing nuclear fuel pellets, a free-flowing fissile powder is mixed with a free-flowing fertile powder and the mixture is placed in the heat-shrinkable container. The container is sealed, heated and isostatically pressed, then decomposed and the powder is sintered.

17 Claims, 2 Drawing Figures

FIG. I

NUCLEAR FUEL FABRICATION PROCESS

BACKGROUND OF THE INVENTION

In the manufacture of recycle pellets for use as nuclear fuel in light water and breeder reactors, it is necessary to process large quantities of highly radioactive powders. These processes typically involve the mixing of fissile material (i.e., material containing elements which can undergo fission) with fertile material (i.e., material containing elements capable of becoming fissile). These powders must be mixed in precise proportions to maintain the proper fissile content of the pellets. After mixing, the pellets are fabricated, sintered, and ground to the proper tolerances.

Because pellet manufacture involves such highly radioactive materials, the processing must be done by remote control in a protective canyon, which greatly adds to the difficulty and expense of the manufacturing procedure. In addition, because fine powders are being processed, a dust is produced which clings to and coats the walls and manufacturing equipment. Since some of this dust can contain plutonium, which can be used for making bombs, it is difficult to account for all the plutonium involved in the process in order to insure the nonproliferation of nuclear weapons. Also, because the powder adheres to the processing equipment, it is difficult to produce fuel having different specifications because the powder remaining in the equipment tends to contaminate new powders processed in the equipment. Still another difficulty is the tendency of submicron powders of different chemistries to segregate during blending and during pneumatic transport which results in the production of inhomogeneous pellets.

SUMMARY OF THE INVENTION

We have discovered a method of making a nuclear fuel pellet which avoids most of the difficulties encountered in previous processes. In our process, the powders are processed in a sealed container, thereby eliminating most of the problems created by powder dust. In addition, the fissile and fertile powders are not mixed together unil they are about to enter the container. This prevents powders of different chemistries from segregating during blending and pneumatic transport.

Finally, in our invention the production of pellets of hourglass shape and inhomogeneous density is avoided by pressing the powders isostatically. As a result, it is expected that less grinding will be required to bring the pellets of this invention into the correct tolerances. Another advantage of isostatic pressing is that the pellets can now be made of greater length.

Additional advantages include a decrease in the number of manufacturing operations, a smaller floor space requirement, and simpler remote maintenance procedures. Also, because the pellets are enclosed in a plastic container, pellet damage such as chipping, capping, and fracture should be greatly reduced. Another advantage is that pellets of different compositions can be made using the same apparatus without extensive cleaning operations in between, because free-flowing powders are used and the powders are enclosed in a container through much of the manufacturing procedure.

DESCRIPTION OF THE INVENTION

Figure 1:
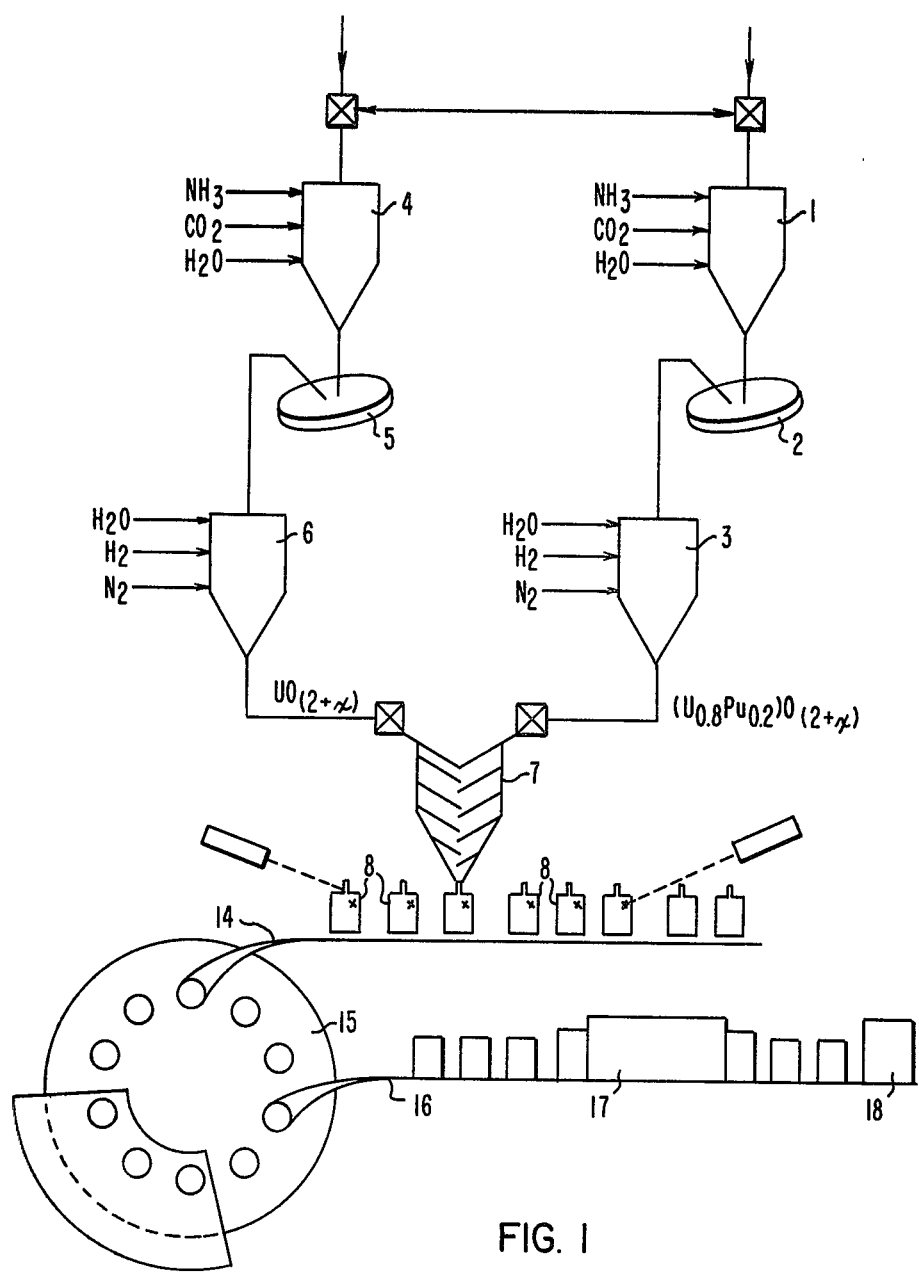
FIG. 1 is a block diagram illustrating a certain presently preferred process according to this invention for making nuclear fuel pellets.

In FIG. 1, a nitrate solution containing uranium and/or plutonium and an ammonia generating liquid are admitted into precipitation vessel 1 which contains a hot non-solvent such as trichloroethylene or silicone oil, which results in the precipitation of ammonium uranyl tricarbonate (AUT). The AUT is filtered and dried in drier 2 and is sent to calciner 3 where steam, hydrogen and nitrogen are added to calcine the AUT to uranium dioxide or plutonium dioxide. In a parallel procedure, $UF_6$ or uranyl nitrate is admitted to second precipitation vessel 4 where ammonia, carbon dioxide, and water are added to precipitate AUT. The AUT is filtered and dried in drier 5 and is sent to calciner 6 where water, hydrogen, and nitrogen are added to effect the calcination.

Figure 2:
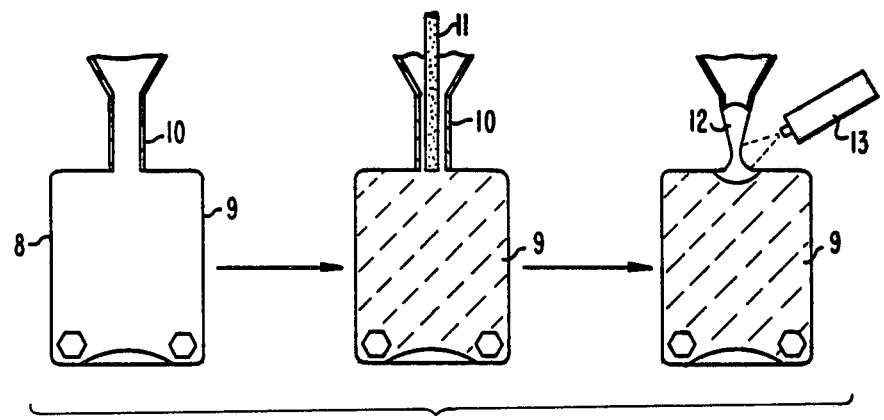
FIG. 2 is a diagrammatic side view in section of a certain presently preferred process according to this invention for filling and sealing a container with a mixed nuclear fuel powder.

The resulting fertile uranium dioxide is mixed with the fissile uranium plutonium dioxide in mixer 7. As the powders are mixed they are fed into containers 8. Referring now to FIG. 2, containers 8 consist of a body portion 9 and a neck portion 10 and are filled by means of a tube 11. Once the tube has been filled, a plug 12 is inserted in the neck and the container is heat-shrunk around the plug by means of laser 13.

Referring again to FIG. 1, the filled containers pass on conveyor 14 to a rotating isostatic press 15 where they are heated and isostatically pressed. The containers then pass on conveyor 16 to furnace 17 which decomposes the container and sinters the pellets. Conveyor 16 then takes the pellets to grinder 18 which polishes the pellets to the correct tolerance.

A fissile powder is a powder which contains a preponderance (i.e. greater than 1%) of fissionable isotopes, and a fertile powder is a powder which contains a preponderance of isotope which can become fissionable in the presence of fast neutrons. Fissile material, for example, includes $^{235}UO_2$ and $PuO_2$ and fertile material includes $^{238}UO_2$ and $ThO_2$. In the plutonium cycle the fissile material is a mixture of $^{235}UO_2$ and $PuO_2$ and the fertile material is $^{238}UO_2$. In the thorium cycle the fissile material is $^{233}UO_2$ or $^{235}UO_2$ and the fertile material is $ThO_2$. The materials may or may not be the result of reprocessing.

The fertile and fissile powders are preferably "free-flowing," which means having an angle of repose of less than about 45°. Free-flowing powders can be prepared in a variety of ways known to the art. For example, the precipitation of ammonium uranyl tricarbonate (AUT) by the addition of ammonia and carbon dioxide-generating compounds to a nitrate solution of the fissile or fertile material, followed by collection of the precipitate, washing, drying, and calcining at about 500° to about 900° C. for about 1 to 5 hours in a hydrogen/steam mixture, generally results in the production of a free-flowing powder. Roll blending, a process where a binder is added to the powders and the mixture is spun in a low speed centrifuge, also may be used to produce a free-flowing powder. The preferred technique for producing free-flowing powders, however, is the sol gel technique because that technique produces a more spherical particle which is more free-flowing. In the sol gel technique an ammonia-containing compound, such as urea or hexamethylene tetramine is added to the nitrate solution and the mixture is added drop-wise into a hot non-solvent such as trichloroethylene or silicone oil, which results in the precipitation of ADU. The precipitate is collected, washed, dried, and calcined to produce the free-flowing powder.

In the second step of the process of this invention the free-flowing fertile and fissile powders are mixed together. The proportion of fertile powder to fissile powder depends upon the degree of enrichment of the particular two powders being mixed and the degree of enrichment in the desired product. Generally speaking, for making pellets for use in fast breeder reactors, the mixture should contain about 20 to about 25% by weight fissile powder, and for making pellets for use in light water reactors, the mixture should contain about 1 to about 5% by weight fissile powder. To avoid separation of the powders after mixing, only so much powder as is necessary to maintain a flow of mixed powder into the containers should be mixed at any one time.

In the third step of the process of this invention, the mixed powder is placed in containers from which the pellets are to be formed. The containers are small bottles made of a heat-shrinkable material such as highly cross-linked polyethylene. The dimensions of the bottle are selected according to the desired size of the resulting pellet, allowing for the shrinkage during pressing and sintering. For a typical ¼-inch pellet for use in a fast breeder reactor, for example, the container might have an inside diameter of about ⅜-inch and be about ¾-inch long. For making a ⅜-inch pellet for use in light water reactors, for example, the container might require an inside diameter of about 9/16-inch and be several inches long. Because the process of this invention produces a more homogeneously pressed pellet which is less subject to fracture, it is expected that pellets produced according to the process of this invention can be made considerably longer than pellets produced from previous processes. The container must also be sufficiently thick to be self-supporting. Each container may have an identifying mark embossed on its inner surface which will leave a corresponding mark on the resulting pellet for identification.

If it is desired to produce cored pellets, that is, pellets with fissile material surrounding a core of fertile material, (or vice versa), a previously prepared core of fertile material is inserted into the container prior to filling the remainder of the container with the fissile powder. If cored pellets are prepared it may be necessary to alter the configuration of the container so as to support the core while the container is being filled with fissile powder. Cored pellets are believed to be more efficient in operation and offer the additional advantage that the fertile core, which is not highly radioactive, can be prepared outside the canyon using fewer safety precautions.

In the fourth step of the process of this invention, the containers are sealed. Sealing can be accomplished in a variety of ways including crimping the neck of the container or inserting a plug into the neck of the container. The preferred method of sealing the container is to insert a plug of un-crosslinked polyethylene into its neck. The neck is then heated which results in the neck shrinking against the plug, forming a seal.

In the fifth step of the process of this invention it is necessary to simultaneously heat the filled, sealed container and isostatically press it so as to cause the container to shrink at about the same rate that the powder contained within it is compressed. The temperature required will depend upon the particular material of which the container is made. Highly cross-linked polyethylene will shrink at a temperature of about 100° to 150° C. Isostatic pressing is done in a hot fluid. A liquid metal is preferred for this purpose, as metals have lower vapor pressures than do non-metallic liquids, but non-metallic liquids such as silicone oil, could also be used. Woods metal is particularly preferred due to its low melting point and low vapor pressure. Typically, about 30,000 to about 60,000 pounds per square inch will be necessary to reduce the volume of the powder by about 40 to about 60%. Heating and isostatic pressing may be done with individual containers or with a large batch of many containers at once. Pressing is preferably "wet-bag" (i.e. no permanent extra container in the press) as opposed to "dry-bag" as it is more efficient.

In the sixth step of the process of this invention the containers are decomposed and the pressed powder within them is sintered to form the pellets. Decomposition of the container and sintering of the powder can be performed as two separate steps, or decomposition can be part of the sintering process. The temperature required for decomposition will depend upon the particular material from which the container is made. Cross-linked polyethylene requires a temperature of about 300° C. for decomposition.

During sintering, the bulk volume occupied by the compressed powder typically decreases by another 40 to 60%. The density is increased to about 95% of theoretical for light water reactors and to about 88 to about 92% of theoretical for breeder reactors. The final density obtained can be controlled by adding pore formers to the powders and by the amount of pressure used in the isostatic pressing step. While sintering is normally performed at about 1700° to about 1800° C., the sintering temperature can be reduced to about 1100° to about 1400° C., which saves energy, by performing the sintering at a higher partial pressure of oxygen than is normally used during hydrogen sintering of fuel pellets. This is a preferred procedure as it reduces the energy requirement of the process. If oxygen is used it is necessary to reduce the oxidized $UO_2$ produced (i.e. $UO_{2+x}$) with hydrogen at about the same temperature in order to reform $UO_2$. Typically about 2 to about 5 hours are required for sintering and about 1 hour is required for reduction.

While it is expected that pellets produced according to the process of this invention will be dimensionally more precise than pellets produced according to prior processes, it may nevertheless be necessary to perform a light grinding step if the pellets exceed required tolerances.

The following example further illustrates the process of this invention.

EXAMPLE

A ¼-inch diameter rubber balloon 6 inches long was filled with alumina powder until the diameter of the balloon was about ⅜-inch. The filled balloon was pressed isostatically in water at 30,000 psi which reduced its diameter to about ⅜-inch. The surface of the alumina was smooth and wrinkle free. The balloon adhered to the surface of the alumina and there were no holes in the balloon. This experiment demonstrates the feasibility of the process of this invention.

We claim:

1. A method of making a pellet from a powder comprising:
   (A) placing said powder in a heat-shrinkable self-supporting bottle;
   (B) sealing said self-supporting bottle;
   (C) isostatically pressing said self-supporting bottle at a temperature which causes it to shrink at about the same rate that the powder within it is compressed; and
   (D) decomposing said self-supporting bottle and sintering said powder.

2. A method according to claim 1 wherein said powder is a mixture of fissile and fertile nuclear fuel.

3. A method of making a nuclear fuel pellet comprising
   (A) preparing a free-flowing fissile powder and a free-flowing fertile powder;
   (B) mixing said free-flowing fissile powder with said free-flowing fertile powder;
   (C) filling a heat-shrinkable self-supporting bottle with said mixed powders;
   (D) sealing said self-supporting bottle;
   (E) heating and isostatically pressing said self-supporting bottle so that the bottle shrinks at about the same rate that the powder within it is compressed; and
   (F) decomposing said self-supporting bottle and sintering said powder.

4. A method according to claim 1 wherein said powder is fissile nuclear reactor fuel and a fertile core of nuclear reactor fuel is placed in said self-supporting bottle before said powder.

5. A method according to claim 3 wherein said fissile powder is a mixture of $^{235}UO_2$ and $PuO_2$ and said fertile powder is $^{238}UO_2$.

6. A method according to claim 3 wherein said fissile powder is $UO_2$ and said fertile powder is $ThO_2$.

7. A method according to claim 3 wherein said heat-shrinkable self-supporting bottle is made of cross-linked polyethylene.

8. A method according to claim 3 wherein said self-supporting bottle is sealed with a plug which is fused to said self-supporting bottle.

9. A method according to claim 3 wherein said mixed powder is about 20 to about 25% by weight fissile powder and about 75 to about 80% by weight fertile powder.

10. A method according to claim 3 wherein said mixed powder is about 1 to about 5% by weight fissile powder and about 95 to about 99% by weight fertile powder.

11. A method according to claim 3 wherein said powders are mixed only as needed to fill said self-supporting bottle.

12. A method according to claim 3 wherein said self-supporting bottle is heated at about 100° to about 150° C. and pressed at a pressure sufficient to reduce its volume by about 40 to about 60%.

13. A method according to claim 3 wherein said self-supporting bottle is pressed at about 30,000 to about 60,000 psi.

14. A method according to claim 3 wherein said sintering is under conditions sufficient to reduce the volume of said self-supporting bottle by about 40 to about 60%.

15. A method according to claim 3 wherein said sintering is performed under a greater than atmospheric partial pressure of oxygen at a temperature of about 1100° to about 1400° C. which is followed by reduction in hydrogen.

16. A method according to claim 3 including the additional last step of grinding said pellets to a desired tolerance.

17. A method according to claim 3 wherein said free-flowing fertile powder and said free-flowing fissile powder are prepared by the sol-gel technique.

* * * * *